(12) United States Patent
Lahr et al.

(10) Patent No.: US 10,473,197 B2
(45) Date of Patent: Nov. 12, 2019

(54) VEHICLE PROPULSION SYSTEM TORQUE TRANSFER VIBRATION ATTENUATION MECHANISM

(71) Applicant: GM GLOBAL TECHNOLOGY OPERATIONS LLC, Detroit, MI (US)

(72) Inventors: Derek F Lahr, Howell, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 255 days.

(21) Appl. No.: 15/615,104

(22) Filed: Jun. 6, 2017

(65) Prior Publication Data

US 2018/0347676 A1   Dec. 6, 2018

(51) Int. Cl.
| | |
|---|---|
| *F16D 3/12* | (2006.01) |
| *F16H 15/52* | (2006.01) |
| *F16F 15/121* | (2006.01) |
| *F16F 15/14* | (2006.01) |
| *F16F 1/10* | (2006.01) |
| *F16F 1/12* | (2006.01) |

(52) U.S. Cl.
CPC .............. *F16H 15/52* (2013.01); *F16F 1/10* (2013.01); *F16F 1/123* (2013.01); *F16F 15/1213* (2013.01); *F16F 15/145* (2013.01)

(58) Field of Classification Search
CPC ......... F16H 15/52; F16F 15/139; F16F 15/12; F16F 15/134; F16F 15/30; F16D 13/00
USPC ............................. 464/58, 59, 68.8; 267/156
See application file for complete search history.

(56) References Cited

U.S. PATENT DOCUMENTS

| | | | | |
|---|---|---|---|---|
| 3,167,308 | A | * | 1/1965 | Bernstein .................. F16F 1/10 267/156 |
| 4,185,728 | A | * | 1/1980 | Gatewood ........... F16F 15/1238 464/68.8 |
| 5,495,924 | A | | 3/1996 | Shaw et al. |
| 6,585,091 | B2 | * | 7/2003 | Reinhart .................. F16F 1/34 464/59 |
| 8,424,659 | B2 | | 4/2013 | Otanez et al. |
| 8,931,607 | B2 | | 1/2015 | Bai et al. |
| 9,500,259 | B1 | | 11/2016 | Bai |
| 2017/0045111 | A1 | | 2/2017 | Li et al. |

FOREIGN PATENT DOCUMENTS

GB          10530     *  5/1893  ...................... 464/59

OTHER PUBLICATIONS

Rebull, L.M., "How to Make a Graph" University of Chicago Winter Quarterly 1994 [online] [retrieved on Feb. 8, 2019], Retrieved from the Internet: <URL:http://astro.uchicago.edu/cara/outreach/resources/other/howtograph.html>. (Year: 1994).*

* cited by examiner

*Primary Examiner* — Greg Binda
(74) *Attorney, Agent, or Firm* — Quinn IP Law

(57) ABSTRACT

A torque transfer mechanism includes an input member to receive an input torque from a propulsion source and an output member coupled to the input member to transfer the input torque to a driveline component. The torque transfer mechanism also includes a damping mechanism having at least one spring element to restrict relative rotation between the input member and the output member. wherein the at least one spring element defines a first spring rate corresponding to an initial range of travel that is less than a second spring rate corresponding to a subsequent range of travel.

15 Claims, 12 Drawing Sheets

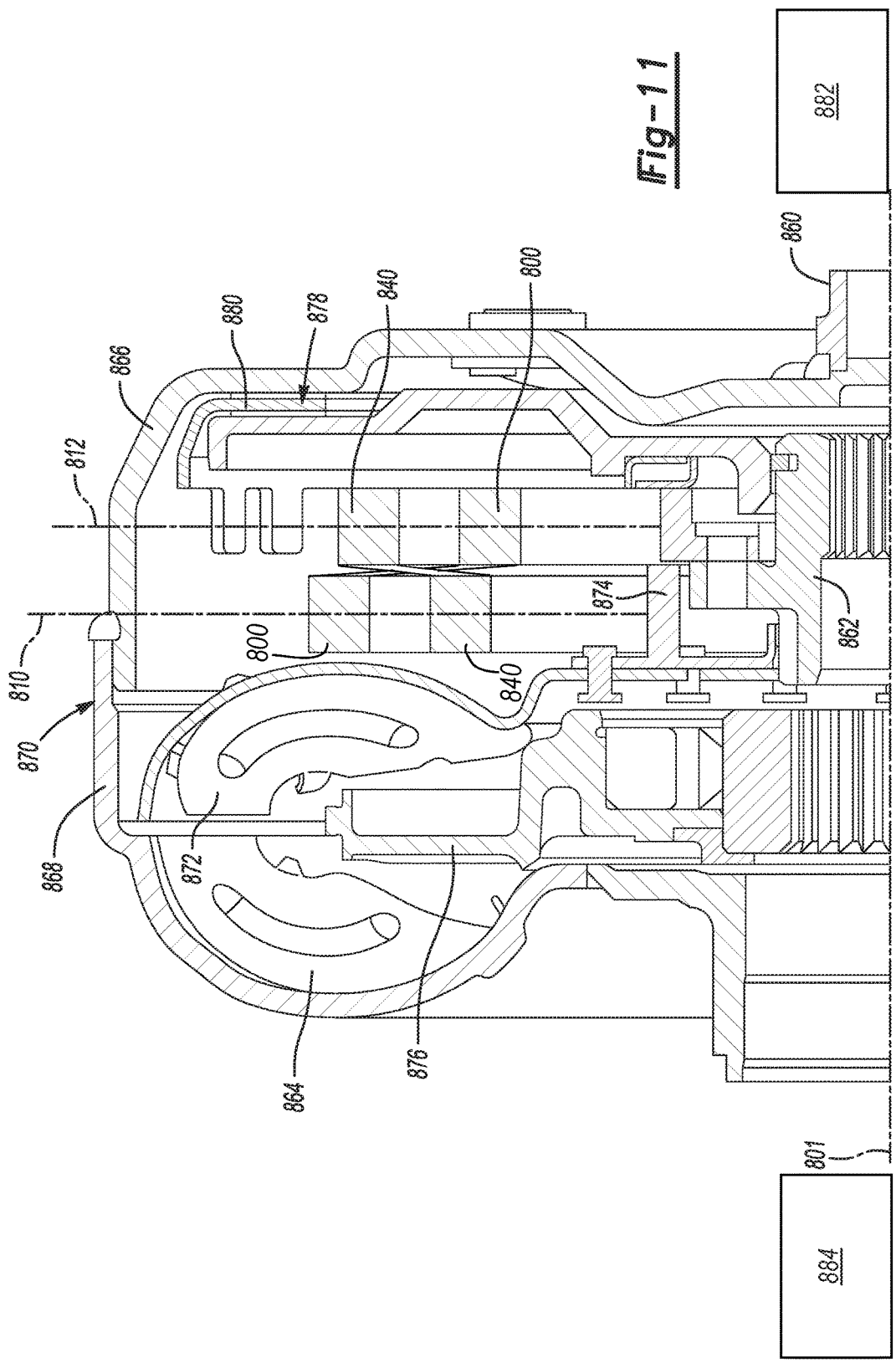

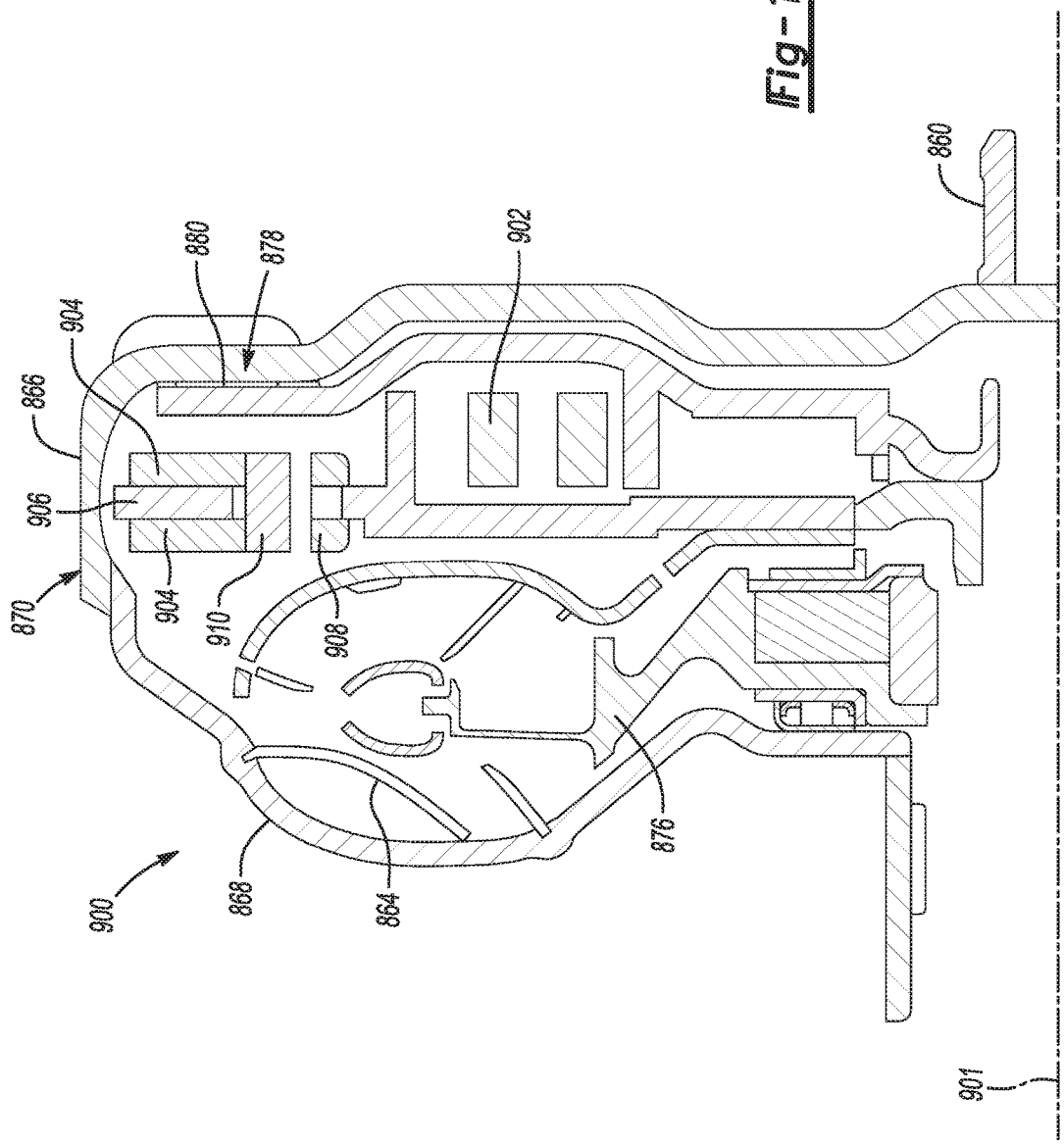

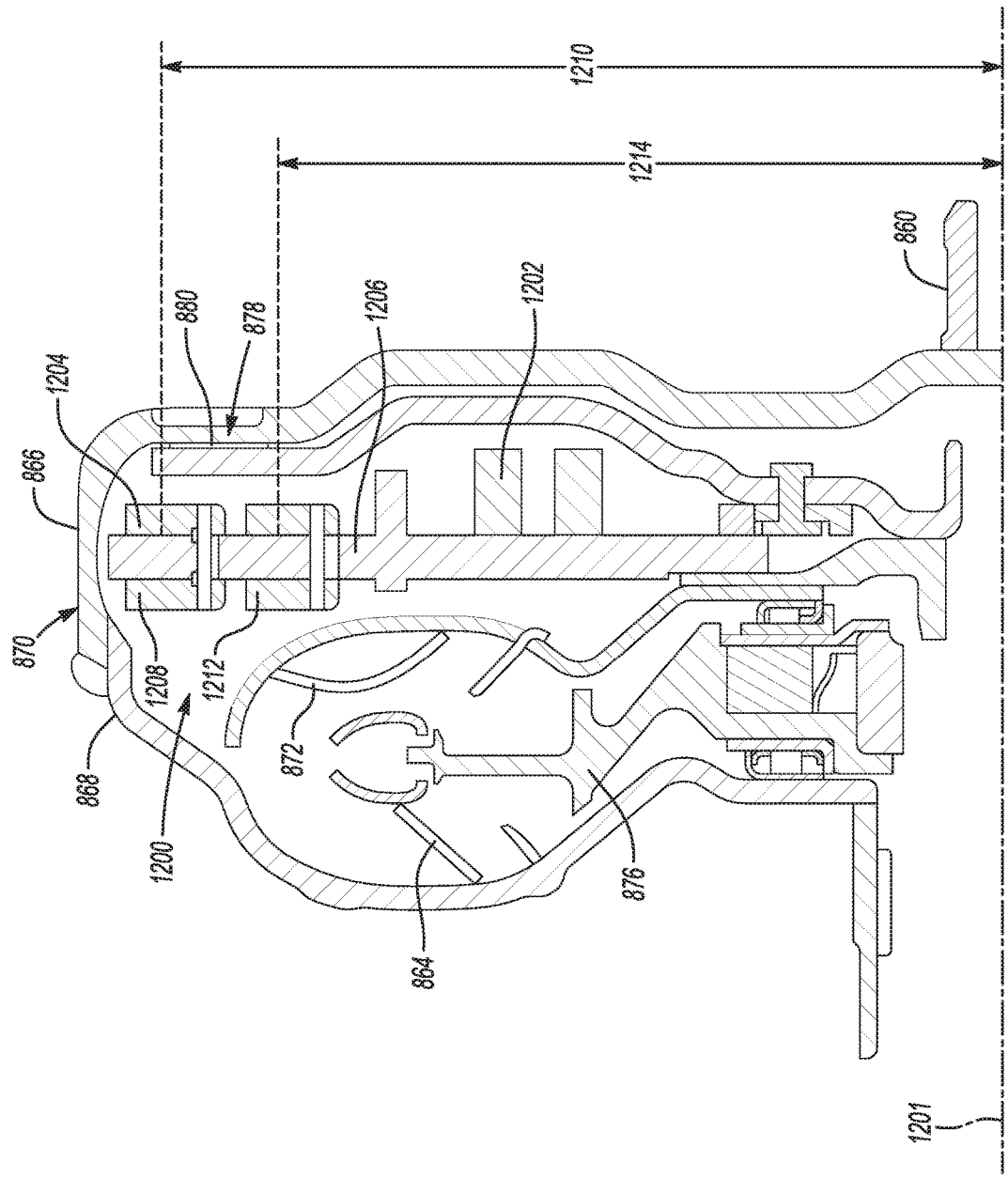

US 10,473,197 B2

VEHICLE PROPULSION SYSTEM TORQUE TRANSFER VIBRATION ATTENUATION MECHANISM

TECHNICAL FIELD

The present disclosure relates to damping driveline disturbances while transferring torque.

INTRODUCTION

Engine torque perturbations which are not attenuated by a driveline device such as a torque converter may be passed directly through one or more torque couplings such as clutches to downstream portions of a driveline and vehicle structure. These torque perturbations may produce undesirable pulsations, fore-aft surging, and/or vibrations which may be perceived by a passenger. The activation of a torque coupling clutch may be restricted to certain limited vehicle operating conditions in effort to minimize some portion of these undesirable effects. However, it may be difficult to recognize acceptable conditions under which to activate the torque coupling clutch using a conventional powertrain controller to avoid these disturbances.

SUMMARY

A torque transfer mechanism includes an input member to receive an input torque from a propulsion source and an output member coupled to the input member to transfer the input torque to a driveline component. The torque transfer mechanism also includes a damping mechanism having at least one spring element to restrict relative rotation between the input member and the output member. wherein the at least one spring element defines a first spring rate corresponding to an initial range of travel that is less than a second spring rate corresponding to a subsequent range of travel.

A torque transfer mechanism includes a rotatable input member to receive an input torque from a propulsion source and at least one elastic spring element arranged to receive transferred torque from the rotatable input member. The torque transfer mechanism also includes an output member torsionally coupled to the elastic spring element, where the output member is configured to transfer torque to a downstream element in a driveline. The at least one spring element includes a clockspring defining a thin first portion that deforms during an initial travel according to a first spring rate and a thick second portion that deforms during a subsequent travel according to a second spring rate.

A torque transfer mechanism includes an input member to receive an input torque from a propulsion source and an output member coupled to the input member to transfer the input torque to a driveline component. The torque transfer mechanism also includes a first clockspring and a second clockspring arranged to cooperate to resist relative rotation between the input member and the output member. The first and second clocksprings are interleaved with respect to each other such that coil length portions of the clocksprings contact each other to restrict further deformation of a first portion of the coil length after a predetermined initial rotation travel.

BRIEF DESCRIPTION OF THE DRAWINGS

FIG. 11 is a cutaway view of a torque transfer device including a pair of interleaved composite spring elements.

FIG. 13 is a cross-sectional view of the torque transfer device of FIG. 12.

FIG. 16 is a cross-sectional view of an additional example torque transfer mechanism having a plurality of pendulum mass absorbers

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In a number of variations a vehicle propulsion system may include a multi-speed transmission and driveline to transfer power to propel the vehicle. A power propulsion source for example, such as a combustion engine or an electric motor, generates an input torque that is transferred through the driveline. In some variations, the power propulsion system may include an additional propulsion source to selectably supplement a primary propulsion source. Related to the desired propulsion states based on operating conditions, torque from any of the available propulsion sources may be selectably coupled or decoupled from the driveline of the vehicle. As the one or more of the propulsion sources is engaged with the driveline, torque and speed perturbations may occur and be perceived by passengers as vibration and/or harshness. At low vehicle travel speeds, such vibrations may be more readily apparent when a torque coupling such as a locking clutch is engaged. The perceptible engine torque perturbations may operate to undermine confidence in vehicle and engine stability. Chuggle may be avoided in some cases by restricting the timing of clutch lockup to higher speeds, which can result in a sacrifice to engine fuel economy at lower speeds.

Figure 1:
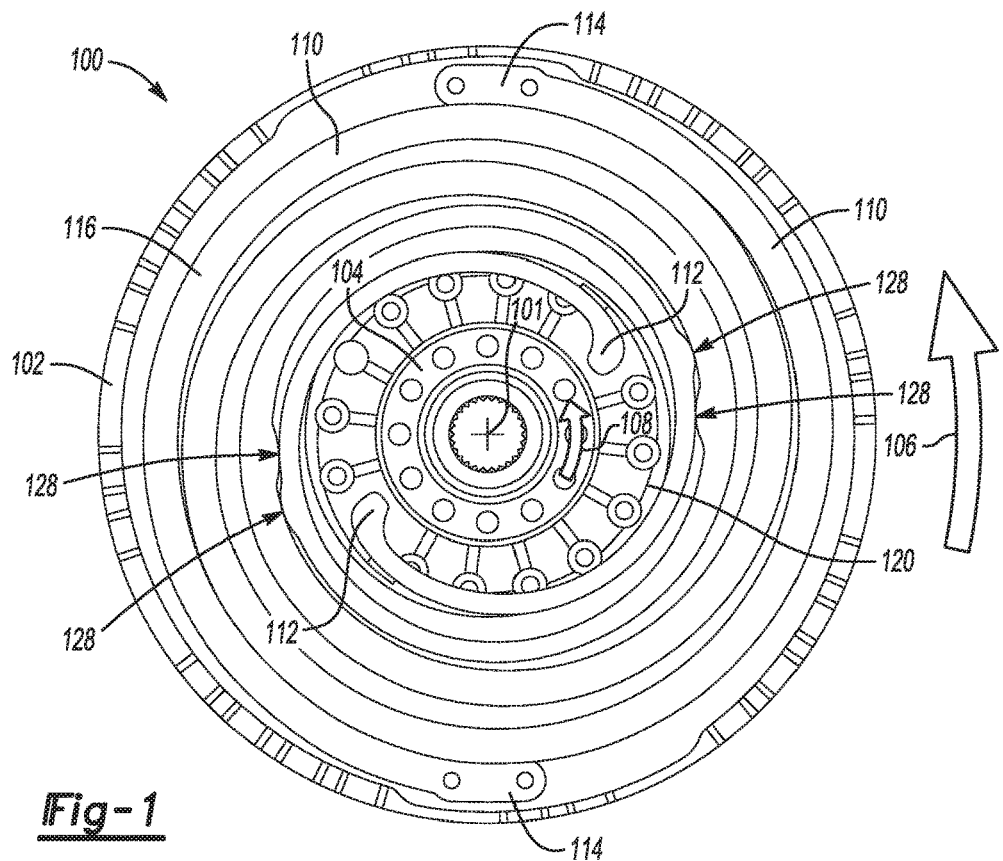
FIG. 1 is a partial view of a torque transfer device along an axis of rotation.

In the transmission of torque from a power source, the attenuation of vibrations may be desirable or necessary. For example, in an application involving a vehicle with an internal combustion engine connected to a transmission and driveline through a torque converter, tailored attenuation of vibrations may enable broader clutch lockup opportunities and thus improved efficiency. In particular, a torque transfer device as illustrated in FIG. 1, may be part of a torque coupling. Generally, the torque coupling connects a power source and a power transmission system. In some examples the power source comprises an internal combustion engine of the type used in automobiles for propulsion. In other examples the power source includes an electric machine arranged to output torque to propel the vehicle and/or supplement the internal combustion engine. Similarly, the power transmission system may include a variable ratio transmission and driveline to transfer power to propel the vehicle. In other examples the power transmission system may involve another type of power source and/or another type of power transmission system. Discussed in more detail below, the torque coupling may be part of a torque converter connected between an engine and a transmission. According to aspects of the present disclosure, enhanced damping is used to compensate for driveline vibration so that torque coupling lockup may occur smoothly at low vehicle speeds to improve engine fuel economy.

A damper may be included because the power source and power transmission system when operating may have a resonance point where the excitation of firing pulses, such as from an internal combustion engine, result in vibration spikes in the power transmission system that are perceived by vehicle passengers. The damper may be advantageously designed to enable lockup of the lockup clutch over an extended range of operating conditions. Discussed in more detail below, the damper may have a low spring rate to tailor the resonance point of what may be referred to as a damper mode, to a selected frequency. The reduced stiffness of a lower spring rate means the damper operates with additional compression, or travel, to handle the same amount of torque. In some examples, a long-travel damper is accomplished by a clockspring type damper. Such a clockspring arrangement provides the low spring constant and long extension capability (i.e., long-travel) relative to other types of damping elements. The term "long-travel" as used herein may characterize an extended rotation angle allowed by the spring having a relatively low spring constant.

Referring to FIG. 1, a torque transfer mechanism 100 allows for torque from an input member 102 to be transferred to an output member 104. The input member is arranged to receive input torque about an axis of rotation 101 in a direction 106 generated by one or more power sources (not shown). The output member 104 passes the input torque to other driveline components which are downstream in the torque flow of the propulsion system. As discussed above, the output member may be coupled to an input shaft of a variable ratio transmission.

The input member 102 may be selectively coupled to an output portion of the propulsion source to receive the input torque when so desired. A selectable-state torque coupling may allow the input member and the propulsion source to switch between a coupled state and a de-coupled state. The coupling may include a clutch, belt, gear, and/or other types of torque coupling. Related to the onset of a coupled state from a previously de-coupled state, torque surges and other vibrations may occur in the powertrain system due to the transitions between the different load cases. In certain variations the torque transfer mechanism 100 may be included as part of a fluid coupling torque converter. In this example, the torque converter may include a lockup clutch that can be applied as the speed of a turbine output portion of the approaches the speed of an impeller input portion so that a fixed mechanical link is established between the input and output. Discussed in more detail below, a friction plate may be provided on a piston such that when actuated, the piston applies pressure between the friction plate and a housing so that the piston rotates with the housing. Similarly, the output member 104 may be connected to an output portion of a driveline to pass torque downstream to propel the vehicle. In some alternative examples, the torque transfer mechanism 100 may be a part of any selectable-state torque coupling device, including for example, a manual transmission clutch, a dual-clutch transmission, and a continuously variable transmission.

Torque transfer mechanism 100 includes one or more damping elements disposed between the input member 102 and the output member 104 to absorb at least a portion of the input torque 106 as it is transformed into an output torque 108. It may be desirable to allow for extended rotational travel between the input member 102 relative to the output member 104. In one example, the damping elements include at least one long-travel spring 110 which is provided to absorb a least a portion of the input torque 106 to help smooth system vibrations or other protuberances. In the example of FIG. 1, a pair of long-travel springs cooperate to resist relative rotation between the input member 102 and the output member 104. The long-travel springs 110 each include an inner end 112, an outer end 114 and a coiled length 116 extending in between the inner end 110 and the outer end 112. The long-travel springs 110 are clocksprings, where each of the springs 110 is wound in a spiral shape from the inner end 112 to the outer end 114. The coiled length 116 may be disposed in a generally in the plane of the view of FIG. 2, which is orthogonal to an axis of rotation 101.

With continued reference to FIG. 1, the clock springs are connected to the input member 102 at the inner end 112, and connected to the output member 104 at the opposing outer end 114. The example clock spring may be formed from rolled metal strips wound into a coil. The springs 110 may alternatively be formed using any material capable of providing a substantial amount of strain energy storage per unit mass. The coil shape enhances the ability to store large amounts of energy for the available volume. In some examples, the damping elements allow for a rotational deflection of at least about 90 degrees. It is contemplated that shorter rotational deflection ranges may still be suitable for damping under certain conditions such as for example, about 30 degrees.

Locking the input member relative to the output member at a low speed condition may provide fuel economy improvements since the lock-up occurs sooner and a locked coupling transfers torque efficiently with little or no losses compared to a fluid coupling which allows relative slip more freely. A reduction in stiffness with the lower spring rate means the long-travel springs 110 must operate with additional compression, or travel, to handle the same amount of torque. As discussed above, a clock spring damper is arranged to provide a long travel of at least 90 degrees while providing low spring rates.

Figure 2:
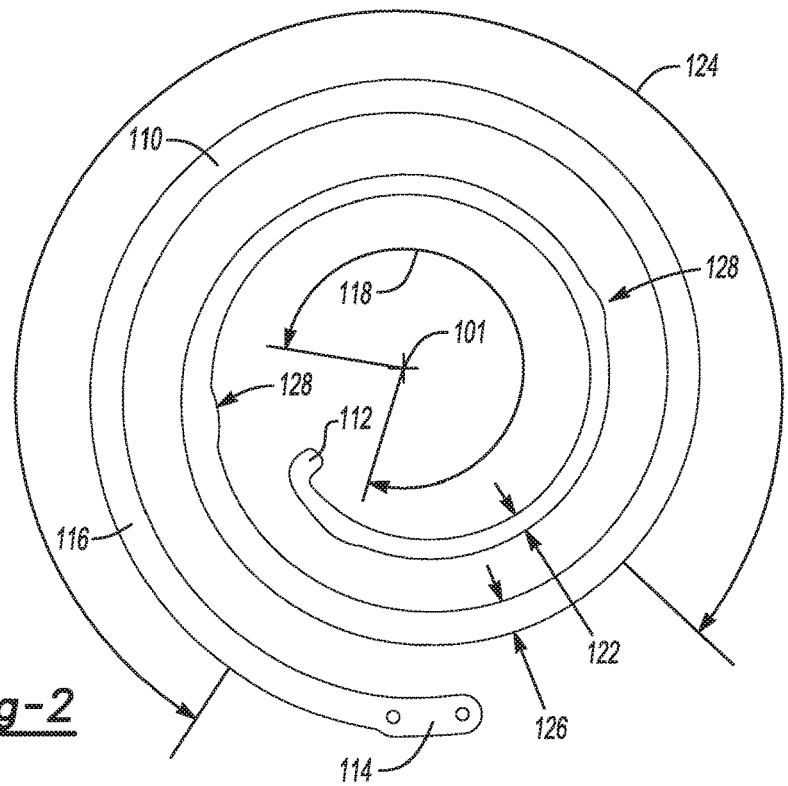
FIG. 2 is a spring element of the torque transfer device of FIG. 1.

With continued reference to FIG. 1 and FIG. 2, the inner end 112 of each long-travel spring 110 may be connected with a receiving feature (not shown) of the output member 104. The inner end 112 may be shaped to be retained within a shaped opening of the inner receiving feature. Similarly, the outer end 114 may be connected with an outer receiving feature disposed on the input member 102. The outer end 114 may also be shaped to correspond to an opening in the receiving feature. Alternative to formed features described above, the long-travel springs 110 may be connected through pins, welds, or other fastening techniques at each end, as well as include additional connections along the coil length 116 of the of the springs 110.

Each long-travel spring 110 has a generally linear torque versus angular travel load profile. The springs may be designed to improve transitions between a coupled state and a non-coupled state of the torque transfer mechanism 100 over a range of operating conditions. A coupled state may refer to a fully or partially locked torque input relative to torque output.

According to some examples, a long-travel clockspring provides a multi-stage spring rate such that the resistive torque of the spring progressively increases as rotational travel is imparted on the spring. Features are provided with the spring to output a varying spring rate that includes a lower spring rate at low torque inputs (thus providing better isolation) and a higher spring rate corresponding to higher torque input. This configuration allows for lower overall mass and volume of the torque transfer mechanism by arranging a single spring to operate in multiple modes as compared to several components to achieve the same function.

In some examples, the springs are shaped such that an inner portion 118 of the coiled length 116 deflects during early portions of relative rotational movement of the input member 102 and wraps a hub 120 of the output member 104. Reduced spring rate during initial travel may be caused by providing a reduced thickness 122 of the inner portion 118 of the spring 110 relative to thicker outer portions. In contrast, outer portions 124 of the spring 110 are provided with a larger thickness 126 to provide a higher secondary spring rate once engaged during later phases of rotational movement. While the examples of FIG. 1 and FIG. 2 depict thinner portions near a center of the torque transfer device and thicker portions radially outward, it should be appreciated that the configuration may be reversed such that thinner portions are located near an outer circumference of the spring and thicker portions located closer to the center.

The springs 110 may also include one or more detent protrusions 128 extending from various locations along the coiled length 116. Depending on where contact is desired, the detents may be located to protrude from inner surfaces and/or outer surfaces of a given spring. In the examples of FIG. 1 and FIG. 2, a plurality of detents 128 extend from both of an inner surface and an outer surface of each of the long-travel springs 110. With specific reference to FIG. 1, a pair of resistive springs cooperate to generate a balanced load to damp input torque perturbations. As the springs are deflected in response to a torque input, the detents 128 are engaged near the end of the initial range of travel. Once the thin portion 118 wraps the hub 120 of the output member 104, it stops deflecting after a predetermined amount of rotation during the initial range of travel. In this way, the thin portions 118 may be disabled during subsequent ranges of clockspring travel. In some examples the hub 120 includes one or more ramped surfaces to receive the thin portion 118 of the springs 110 as they wrap during deflection. The detents 128 operate to lockout further deflection of the thin portion 118 of the springs and correspond to the end of initial range of travel. Once the detents are fully engaged the thin portion 118 deflects no further. The detents 128 thus provide a solid base to support deflection of the thick portion 122 of the coil length 116 during a subsequent range of travel.

Figure 3:
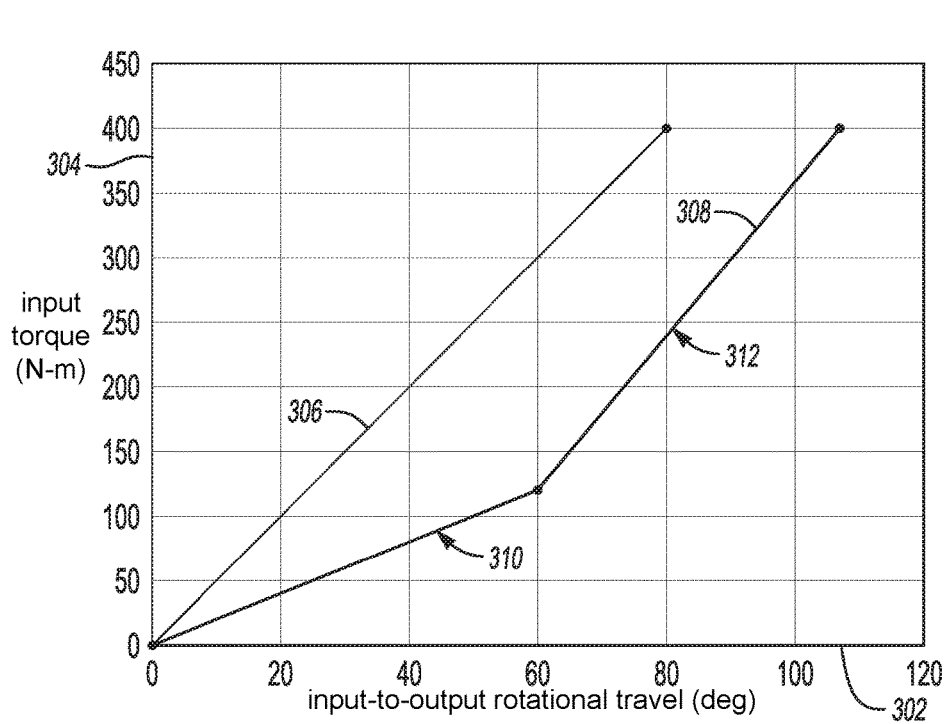
FIG. 3 is a plot of torque versus rotational travel corresponding to a torque transfer device.

Referring to FIG. 3, plot 300 indicates an example loading performance of a torque transfer mechanism having multiple-phase spring rate damping as discussed above. Horizontal axis 302 represents rotational travel in degrees of the input element relative to the output element of the torque transfer mechanism. The travel may correspond to deflection of the springs 110 of the damping mechanism as discussed above. Vertical axis 304 represents torque applied at the input member of the torque transfer mechanism. Curve 306 represents a loading profile for a standard long-travel clock spring having a constant load profile corresponding to a spring constant of about 5 Nm/deg. Curve 308 represents a load profile of a long-travel clock spring configured to multi-stage progressive spring rate. The single rate long-travel spring has higher stiffness in the lower deflection ranges and thus provides less torque isolation between the input member and output member. Conversely, the multi-stage spring corresponding to curve 308 imparts less resistive torque in lower deflective ranges (e.g., less than about 60 degrees) and increases stiffness at higher deflection ranges (e.g., greater than about 60 degrees). In the example of plot 300, a first spring rate in a region 310 is about 2 Nm/deg, and a second spring rate in a region 312 is about 6 Nm/deg. According to aspects of the present disclosure, a spring element of a torque transfer device applies a resistive torque having a multi-stage spring rate where a second spring rate is progressively greater than a first spring rate.

Figure 4A:
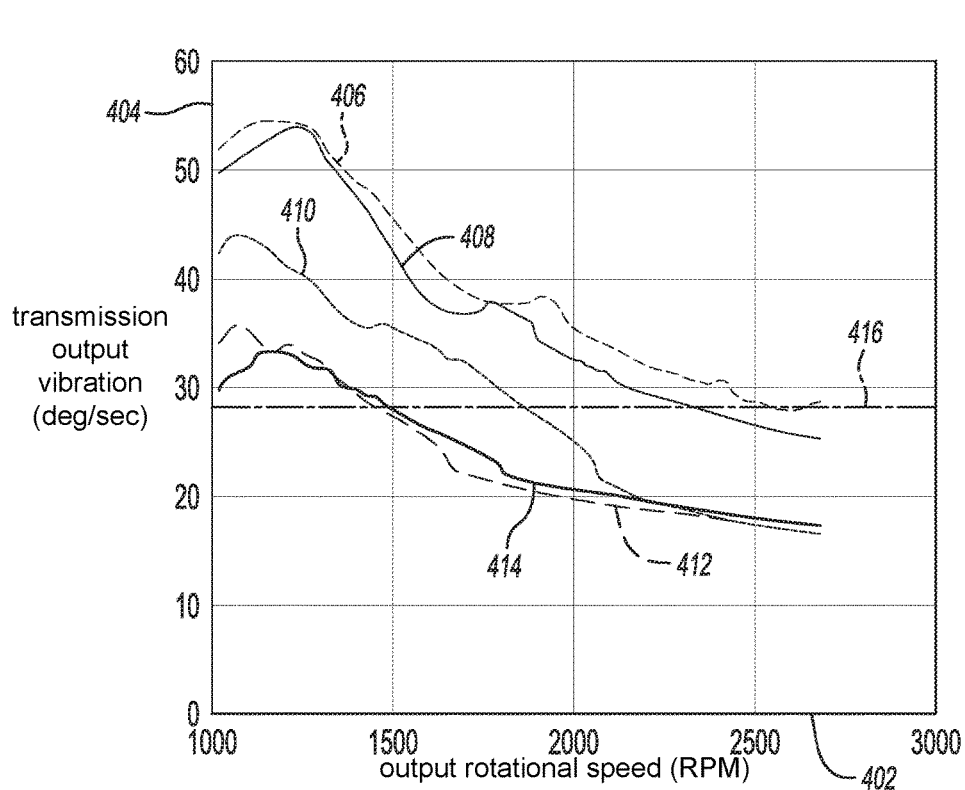
FIG. 4A is a plot of vibration versus input rotational speed for a torque transfer device having a baseline stock damper.
Figure 4B:
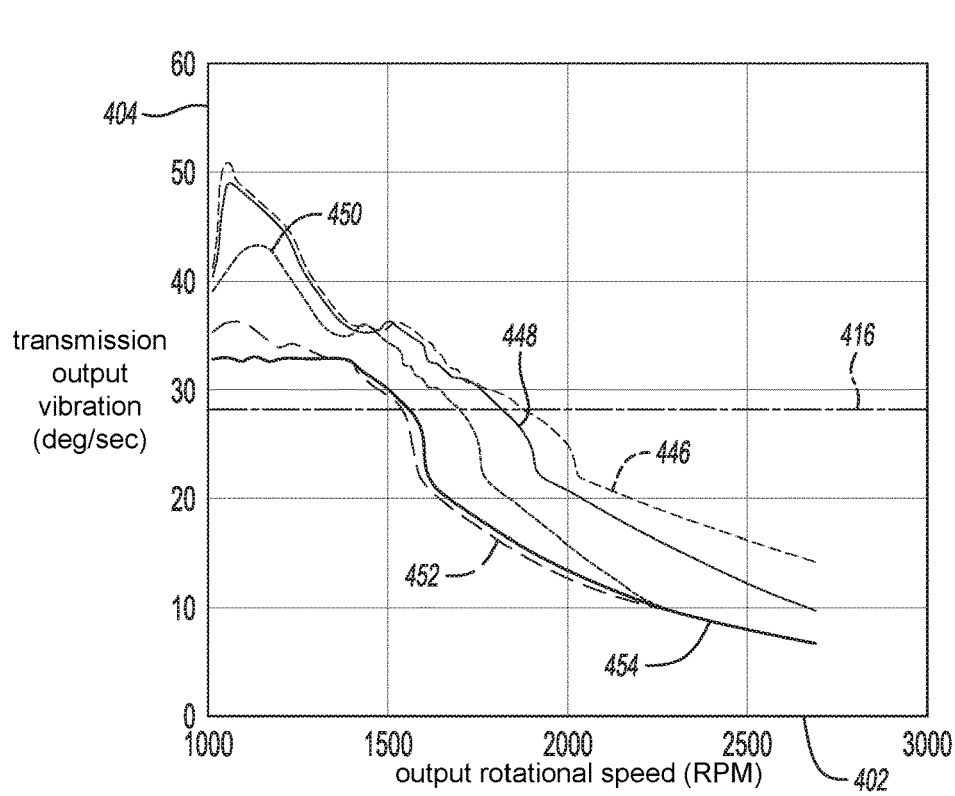
FIG. 4B is a plot of vibration versus input rotational speed for a torque transfer device having a damper with a single spring rate spring element.
Figure 4C:
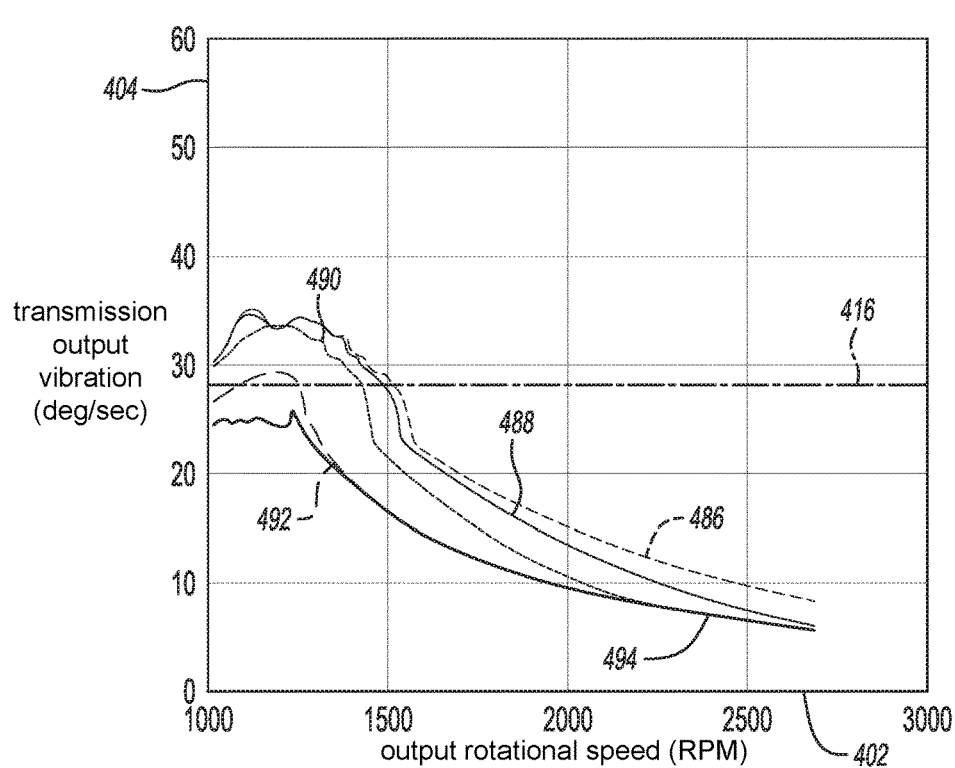
FIG. 4C is a plot of vibration versus input rotational speed for a torque transfer device having a damper with a multi-stage spring rate spring element.

Referring to FIG. 4A through FIG. 4C, plots 400, 440, and 480, respectively, depict a comparison of relative vibration performance of various damper types within a torque transfer mechanism during the onset of an engaged mode of torque transfer. Each of the plots represents a mean input torque of 50 Nm applied to the different devices. As the torque transfer mechanism is engaged, input torque is transferred through the mechanism to produce an output torque to drive downstream driveline components. While the load case of 50 Nm input torque is discussed by way of example, it should be appreciated that other load cases may similarly benefit from examples provided in the present disclosure. Plot 400 corresponds to a stock damper device having a plurality of linear compression coil springs arranged to deflect in a tangential direction in response to relative rotation between an input member and an output member. Plot 440 corresponds to a torque transfer device having a long-travel clockspring damper with a single stage spring rate. Plot 480 corresponds to a torque transfer device having a long-travel clockspring damper with a multi-stage spring rate. In each of the plots, horizontal axes 402 represent rotational output speed of the torque transfer mechanism in rotations per minute (RPM), and vertical axes 404 represent transmission output vibration (TOV) in relative angle rotation per second.

Referring to FIG. 4A, plot 400 depicts vibration performance of a stock damper having a number of compression springs arranged to resist torque inputs. The example stock damper device provides a single spring rate of about 15 Nm/deg. Curves 406 through 414 represent vibration performance during the onset of an engaged mode of torque transfer for various levels of slip of a lockup clutch included with the torque transfer device. In one example, the amount of slip is metered by controlling pressure applied to plates of a friction clutch. Curves 406, 408, 410, 412, and 414 reflect performance of the damper with clutch slip of 0 RPM, 20 RPM, 50 RPM, 100 RPM, and 150 RPM, respectively. It may be preferable to limit or reduce torque disturbances which may arise during the transition between torque transfer modes. A constant TOV limit represented by curve 416 is overlaid on plot 400 and may represent a subjective limit based on acceptable passenger feel. In the examples of FIG. 4, a preferred TOV limit of about 0.5 rad/s, or 29 degrees/s, is depicted. Alternatively, a variable deflection rate TOV limit may be applied to target a signature torque transfer profile to yield a more refined feel during torque engagement for a range speeds. In the case of a stock damper with a linear coil springs, vibration exceeds preferred limits throughout much of the operating conditions. It can be seen that for clutch slip of 0 RPM (curve 406) corresponding to a fully engaged clutch, TOV values exceed the preferred TOV limit for a significant portion of speed range. Even while clutch pressure is reduced to allow relative slip to improve isolation (e.g., 150 RPM; curve 414), vibration remains unacceptable near lower rpm ranges of engaging the torque transfer device.

Referring to FIG. 4B, plot 440 depicts vibration performance of torque transfer device with a long-travel clockspring damper having a single stage spring rate of about 5 Nm/deg. Curves 446, 448, 450, 452, and 454 represent the onset of an engaged mode of torque transfer with clutch slip of 0 RPM, 20 RPM, 50 RPM, 100 RPM, and 150 RPM, respectively. The constant TOV limit (curve 416) of 0.5 rad/s is similarly overlaid on plot 440. While TOV performance is improved relative to the stock damper mechanism performance shown in plot 400, engagement of the torque transfer mechanism exceeds vibration limits for low speed engagement for various levels of clutch slip. For example, vibration is greater than the preferred TOV limit across the 1,000-1,500 RPM range. However engagement of the torque transfer device in such low speed ranges may be beneficial to improve torque transfer efficiency and thus fuel economy. Certain examples of the present disclosure further improve vibration performance in the low speed ranges and enhance drivability.

Referring to FIG. 4C, plot 480 depicts vibration performance of torque transfer device with a long-travel clockspring damper having a multi-stage spring rate. In the example of FIG. 4C, the spring rate transitions from a first stage of about 2 Nm/deg during an initial range of travel to a second stage of about 6 Nm/deg during a subsequent range of travel. Curves 486, 488, 490, 492, and 494 represent damper performance during the onset of an engaged mode of torque transfer with clutch slip of 0 RPM, 20 RPM, 50 RPM, 100 RPM, and 150 RPM, respectively. Like the previous examples, the constant TOV limit (curve 416) of 0.5 rad/s is similarly overlaid on plot 480. It can be seen for plot 480 that the vibration response is less than the preferred TOV limit for a majority of operating conditions across the speed range. More specifically, under high slip conditions (100 RPM slip according to curve 492; and 150 RPM slip according to curve 494) vibration response meets preferred TOV limit for all operating speed ranges. And, certain lower slip conditions (0 RPM slip according to curve 486; 20 RPM slip according to curve 488; and 50 RPM slip according to curve 490) provide suitable vibration response relative to the preferred TOV limit above 1,400 RPM.

Figure 5A:
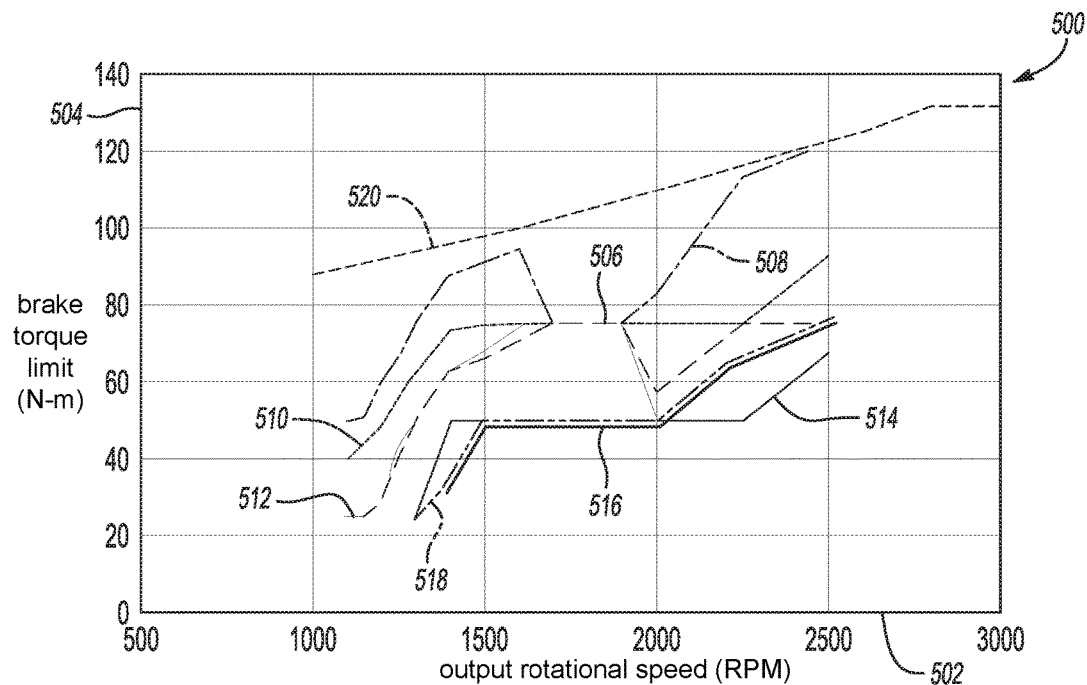
FIG. 5A is a plot of vibration versus input rotational speed for a torque transfer device having a baseline stock damper.
Figure 5B:
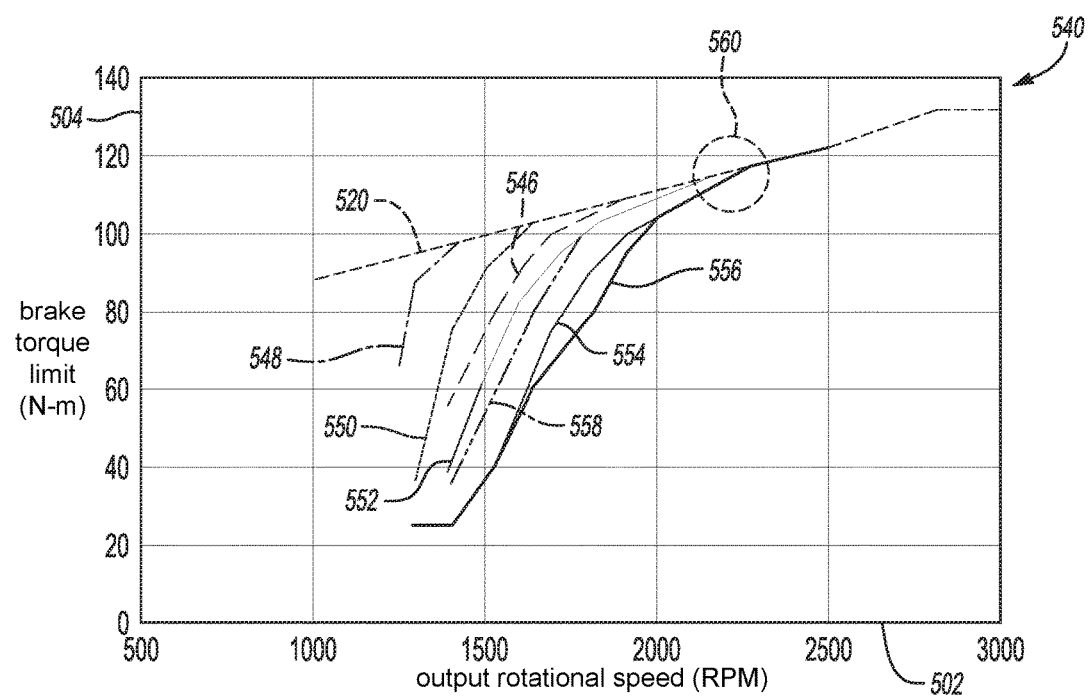
FIG. 5B is a plot of vibration versus input rotational speed for a torque transfer device having a damper with a single spring rate spring element.
Figure 5C:
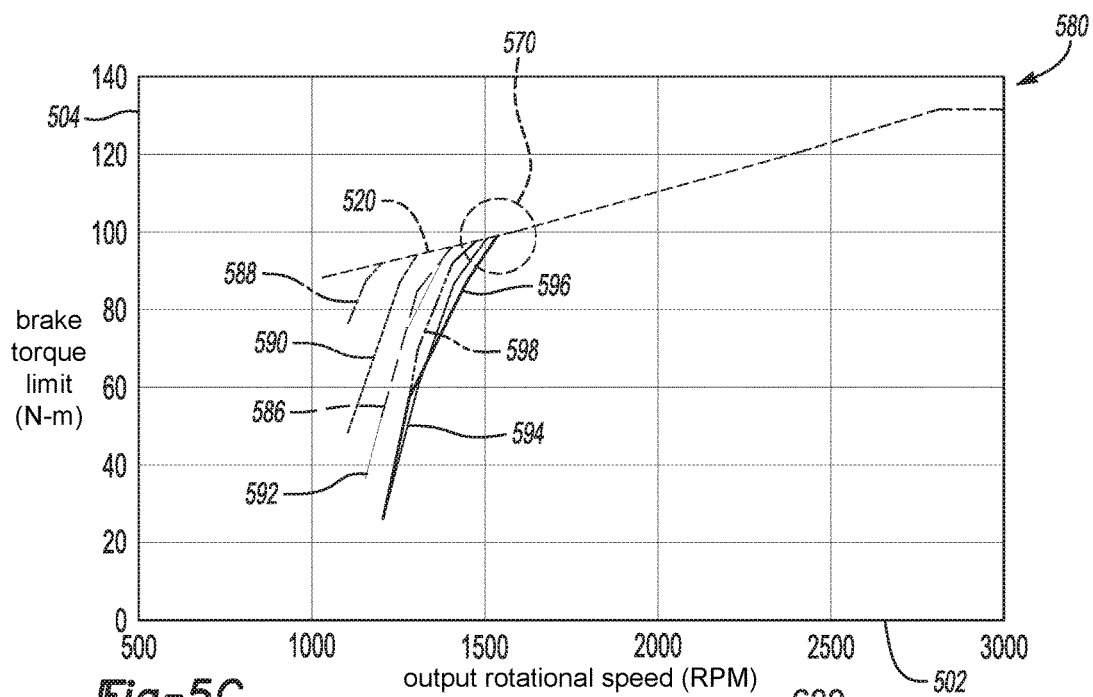
FIG. 5C is a plot of vibration versus input rotational speed for a torque transfer device having a damper with a multi-stage spring rate spring element.

Referring to FIG. 5A through FIG. 5C, plots 500, 540, and 580, respectively, depict a comparison of relative engine brake torque limit (BTL) corresponding to each of various damper types discussed above. Similar to the above discussion regarding vibration performance, plot 500 corresponds to a stock damper mechanism having a plurality of linear compression coil springs arranged to deflect in a tangential direction in response to relative rotation between an input member and an output member. Plot 540 corresponds to a torque transfer device having a long-travel clockspring damper with a single-stage spring rate. Plot 580 corresponds to a torque transfer device having a long-travel clockspring damper with a multi-stage spring rate. In each of the plots, horizontal axes 502 represent rotational output speed of the torque transfer mechanism in RPM, and vertical axes 504 represent BTL in Newton-meters. Related the vibration performance discussed above, the BTL under different operating conditions must be reduced to less that engine maximum capability in order to customer-perceived vibrations.

Referring to FIG. 5A, plot 500 depicts BTL associated with a stock damper mechanism having a number of compression springs. Curves 506, 508, 510, 512, 514, 516, and 518 reflect performance of the stock damper while the transmission is in first gear through seventh gear, respectively. A maximum BTL based on capability of the engine is represented by curve 520. As mentioned above, the practical limit of the engine brake torque is artificially limited in each gear ratio to mitigate vibration effects to be within acceptable limits. As shown in plot 500, in order to manage vibration using a torque transfer device including a stock damper, engine BTL is limited to less than the full capacity of the engine.

Referring to FIG. 5B, plot 540 depicts BTL associated with a long-travel clockspring damper having a single-stage spring rate of about 5 Nm/deg. Curves 546, 548, 550, 552, 554, 556, and 558 represent performance of the damper while the transmission is in first gear through seventh gear, respectively. As engine RPM increases within each respective gear, the damping from the clockspring increases the allowable BTL to provide acceptable vibration. For each gear, the acceptable maximum BTL eventually converges with the engine capacity maximum BTL represented by curve 520. While the acceptable BTL limit corresponding to each of the gears converges to the engine maximum at different speeds, all of the gears deliver acceptable vibration performance at the engine capacity maximum BTL above about 300 RPM as denoted by region 560. As discussed above, it may be desirable to engage the torque transfer mechanism at the lowest possible speed to deliver improved fuel economy.

Referring to FIG. 5C, plot 580 depicts BTL associated with a torque transfer device with a long-travel clockspring damper having a multi-stage spring rate. In the example of FIG. 5C, the spring rate transitions from a first stage of about 2 Nm/deg during an initial range of travel to a second stage of about 6 Nm/deg during a subsequent range of travel. Curves 586, 588, 590, 592, 594, 596, and 598 represent performance of the damper while the transmission is in first gear through seventh gear, respectively. Similar to previous examples, curve 520 representing the engine capacity maximum BTL is overlaid on plot 580. In the case of the multi-rate spring damper, the engine capacity maximum BTL is available at much lower engine speed. That is, the acceptable BTL limit for each of the gears converges with the engine capacity maximum BTL by about 1,500 RPM as denoted by region 570. In FIG. 5C (as contrasted from FIG. 5A) a complete torque transfer which maximizes the use of the available engine BTL occurs over a wider range of operating conditions. In general, a combination providing a lower stiffness damping during low travel and an increased stiffness damping over extended travel ranges enhance vibration performance and allowable engine braking torque during transitions in torque delivery.

Figure 6:
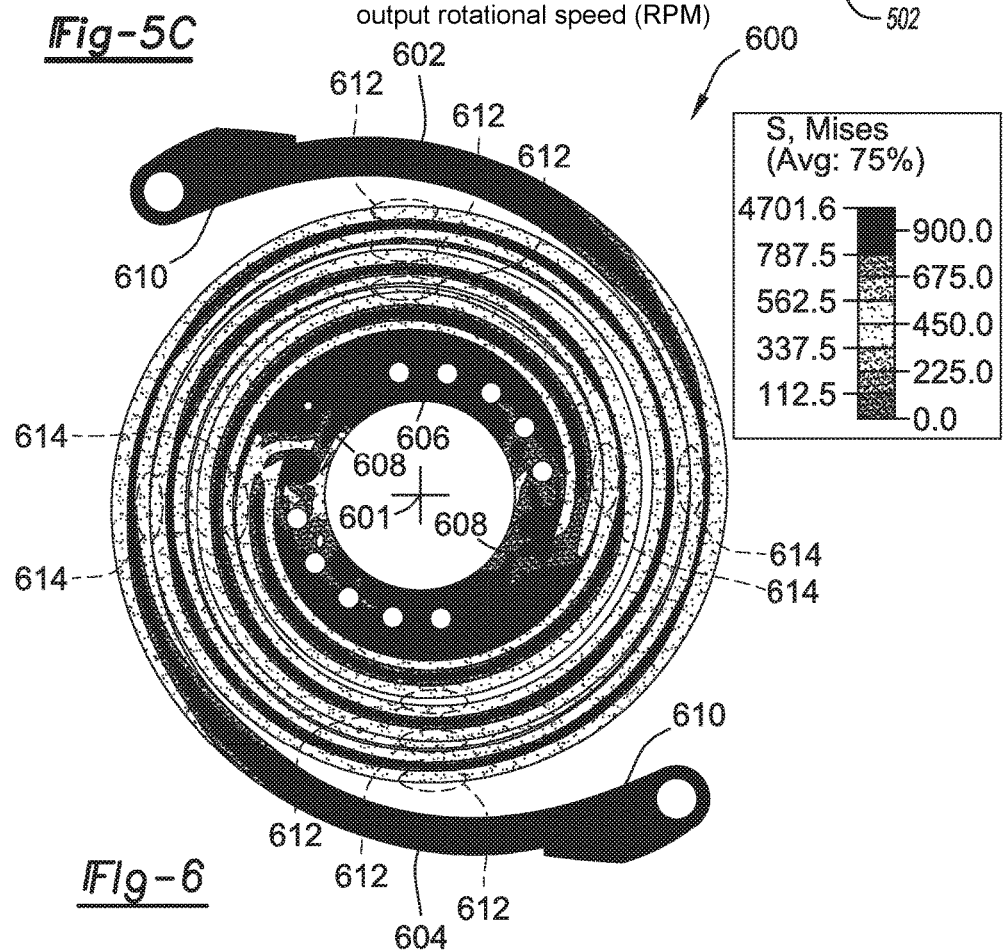
FIG. 6 is a stress contour plot of spring element deflected under a torque load input.

Under some loading conditions, a pair of clocksprings may undergo non-uniform deformation related to contact between the springs. Referring to FIG. 6, a pair of clocksprings are provided in a single plane which causes spring-to-spring contact under certain loading conditions. The single plane is depicted in the direction of view of FIG. 6 as orthogonal to an axis of rotation 601. Contact points between the springs may cause the non-uniform deformation contribute to generating high-stress locations. The example pair of clock springs 600 is deflected in response to a torque load generated from a power source. An input torque about the axis of rotation 601 is applied to the pair of clock springs 600. The figure depicts a deformed structure overlaid with stress contours and distribution of Von Mises stress throughout each spring. A first spring 602 and a second spring 604 are each fixed to a hub member 606 at an inner end 608. An outer end 610 of each of the springs 602 and 604 is coupled to and input member (not shown) as discussed above. As shown in the stress distribution, high stress locations 612 arise vertically above and below the hub 606. At the same time contact locations 614 lateral to the hub are generated between lengths of each of the springs. The contact locations 614 contribute to friction resisting movement between the coil lengths of each of the springs.

Figure 7:
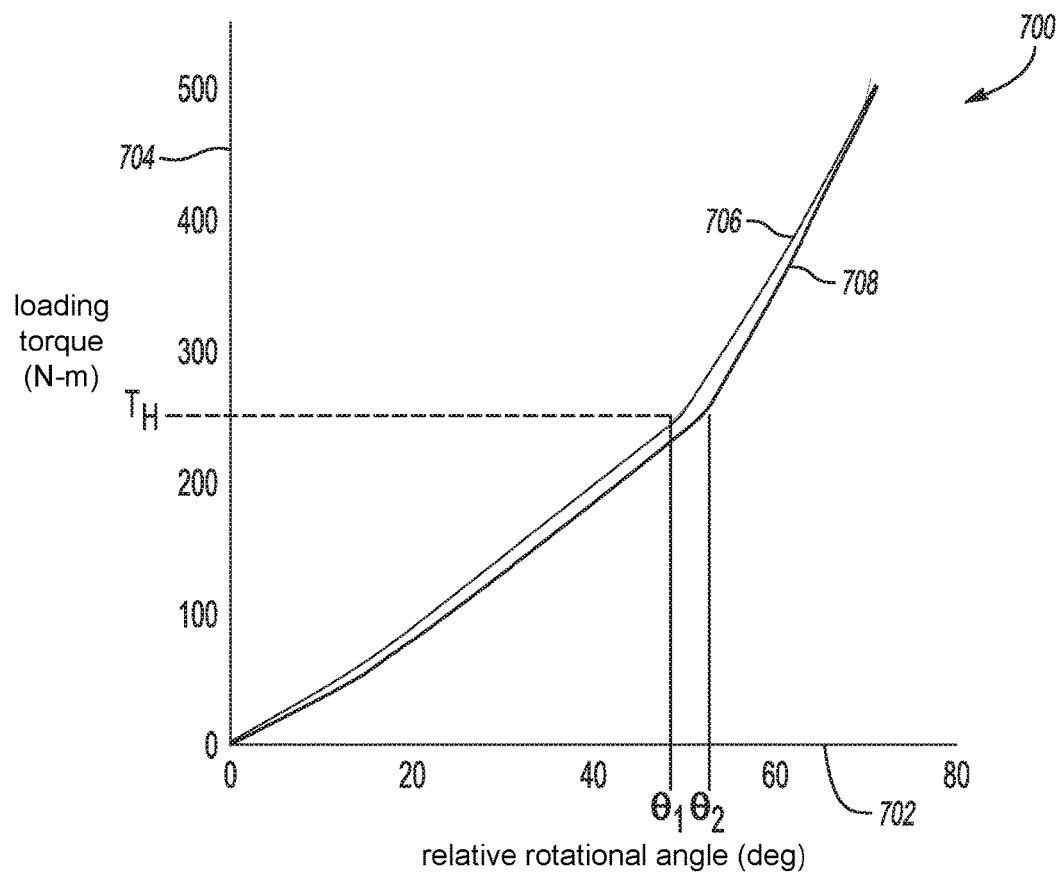
FIG. 7 is a plot of torque load input versus deflection angle of the spring element of FIG. 6.
Figure 8:
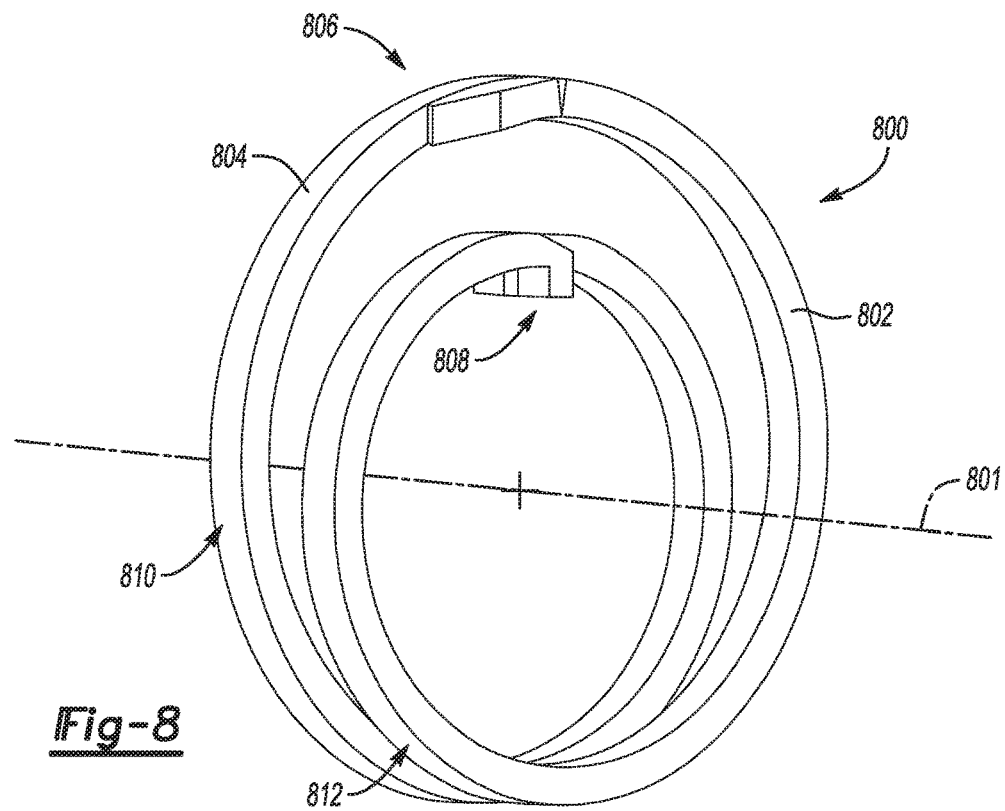
FIG. 8 is a perspective view of a composite spring element embodiment.
Figure 9:
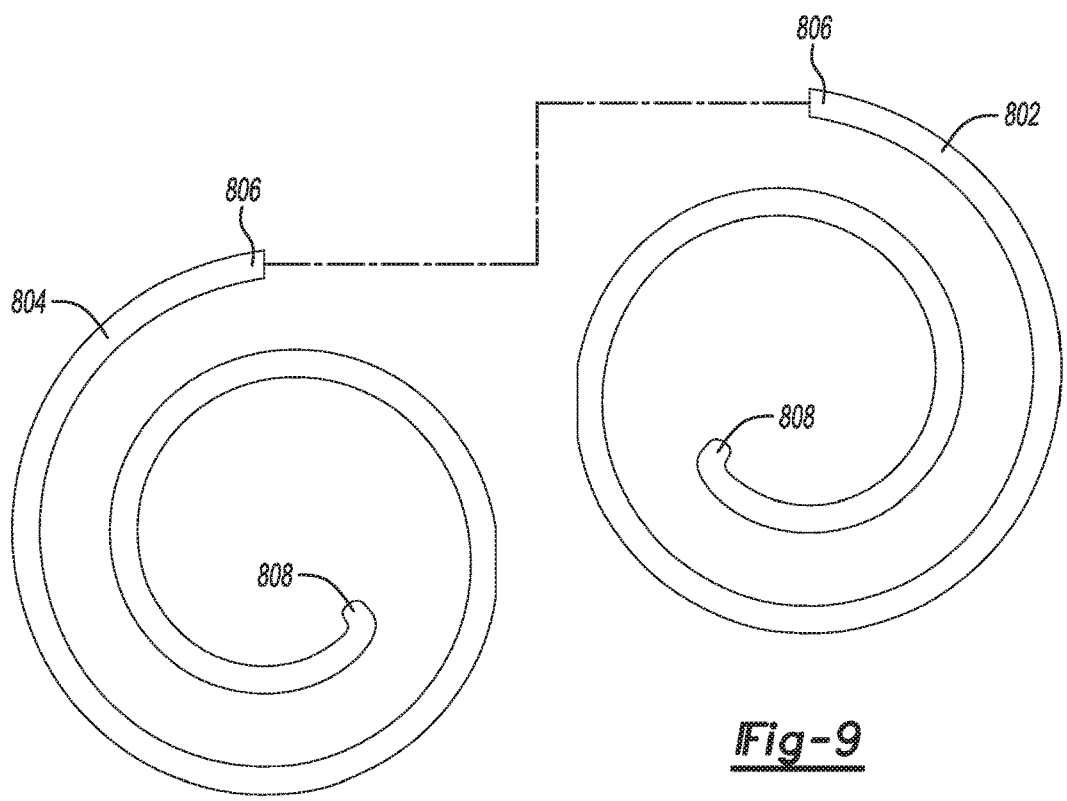
FIG. 9 is an exploded view of the composite spring element of FIG. 8.

Referring to FIG. 7, plot 700 depicts loading torque versus angle for both loading and unloading directions of a damper spring similar to the device of FIG. 6 having a multi-stage spring rate. Horizontal axis 702 represents relative rotation angle between an input member and an output member in degrees. Vertical axis 704 represents torque applied to the spring damper in Nm. Curve 706 depicts a load profile for the damper in the loading direction, and curve 708 depicts a load profile in an unloading direction. It may be seen from plot 700 that for certain portions of the load profile there is a delay, or hysteresis, in the unloading direction of the damper response. The contact between portions of the springs (and the resulting friction) as discussed above contributes to the hysteresis between loading and unloading. In a specific example, a hysteresis torque $T_H$ of about 250 Nm causes different spring responses in the unloading as compared to the loading direction. In the loading direction, $T_H$ causes angular deflection $\theta_1$ of about 49 degrees. Comparatively, the spring is exhibits deflection $\theta_2$ of about 55 degrees corresponding to the same torque load $T_H$ while unloading. This latency during unloading may contribute to an undesirable delay in the operation of the damper spring during cycling. This hysteresis effect may in turn detract from the damping performance of the torque transfer mechanism. Thus it may be desirable to arrange the springs such that maximum stress locations are more uniformly distributed along outer and inner edges, and contact locations between the springs are avoided.

Referring to FIG. 8 through FIG. 11, multiple damper springs may be arranged to accommodate the spring coil length and avoid undesirable contact points causing friction and hysteresis. In this way, the springs may be unconstrained in a radial direction to avoid oblong deformation and the high-stress concentration locations discussed above. Combination spring 800 of FIGS. 8-11 comprises a pair of symmetrically opposing clocksprings 802 and 804 coupled at one end. The combination spring 800 is configured to resist an input torque load about a center axis of rotation 801. In the illustrated example, a first clockspring 802 is fixed to a second clockspring 804 at an outer end 806. The first clockspring 802 is wound in a clockwise direction, and the second clockspring 804 is wound in a counterclockwise direction such that the two clocksprings 802, 804 symmetrically oppose each other. While the terms "clockwise" and "counterclockwise" are used to describe examples where the springs are wound in opposing directions with respect to each other, it should be appreciated that the present disclosure is not limited to any particular frame of reference. An inner end 808 of each of the clocksprings 802, 804 is left unconstrained relative to the other of the pair of springs. The inner end 808 of each of the clocksprings 802, 804 is coupled to an output member (not shown) as discussed above in previous examples.

Certain portions of the coil length 816 of the combination spring 800 of FIGS. 8-11 are in a first plane 810 and other portions of the combination spring 800 reside in an adjacent second plane 812. The outer end 806 of the first clockspring 802 is positioned in the first plane 810, and the coil length 816 transitions between the planes 810, 812 such that the inner end 808 terminates in the second plane 812. In a complementary and opposite fashion, the outer end 806 of the second clockspring 804 is positioned in the second pane 812, wherein the coil length 816 of the second clockspring 804 transitions between the planes 810, 812 such that the inner end 808 thereof terminates in the first plane 810. The multiple plane configuration of the pair of clocksprings 802, 804 allows the coil length 816 portions of the clocksprings 802, 804 to remain radially unconstrained during loading thereby avoiding friction due to spring-to-spring contact. The configuration of the combination spring 800 also distributes pure bending throughout each clockspring 802, 804 and reduces stress risers in locations related to non-uniform loading. The pure bending load also allows the clocksprings 802, 804 to wrap in a more uniform fashion during loading. The pure bending load further distributes stress around the clocksprings 802, 804 more optimally, thereby increasing the amount of strain energy stored per volume.

Figure 10:
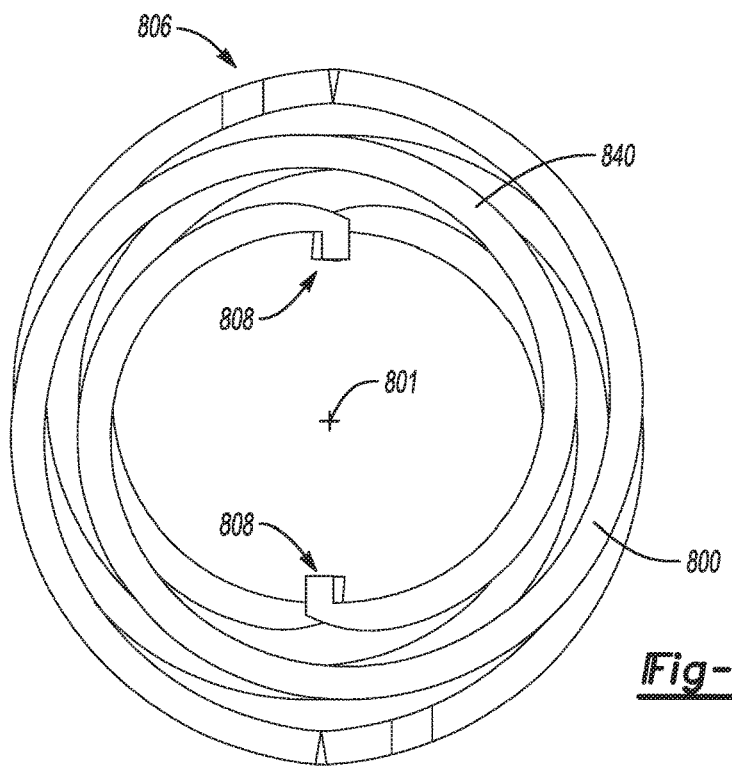
FIG. 10 is a view along an axis of rotation of a pair of interleaved composite spring elements.

With specific reference to FIG. 10, multiple combination springs may be arranged to cooperate to provide spring damping within a torque transfer device. The first combination spring 800 and the second combination spring 840 may both be included within a torque transfer device. Each respective outer end 806 is arranged to receive an input torque about an axis of rotation 801. The shapes of each of the combination springs may be interlocked such that the springs cooperate to receive and transfer torque loads in a symmetric fashion. That is input torque is receive at diametrically opposite locations at outer ends 806. Similarly, the damped output torque is delivered at diametrically opposing inner ends 808.

FIG. 11 depicts a cutaway view of a torque transfer mechanism including a combination spring damper. The torque transfer mechanism is connected to a propulsion power source 882 (e.g., engine, electric machine) through an input shaft 860, and is also connected to a downstream power transmission system 884 through an output shaft 862. The input shaft 860 may be connected with an impeller 864 through a first housing section 866 and a second housing section 868. The housing sections 866, 868 may form a torque converter housing 870 that contains a fluid through which the transfer device may transfer torque. The output shaft 862 may be connected with a turbine 872 through a torque transfer element 874. A stator 876 may also be positioned between the impeller 864 and the turbine 872 and may effect an increase in output through the torque coupling. Rotation of the impeller 864 moves fluid to rotate the turbine 872 so that the output shaft 862 is driven by the input shaft 860.

As discussed above, some examples provide a torque transfer mechanism which includes a lockup clutch 878 that may be applied as the speed of the turbine 872 approaches the speed of the impeller 864 so that a mechanical link, which may be a fixed connection, is established between the input shaft 860 and the output shaft 862. A friction plate 880 is coupled to a piston. When actuated, the piston applies pressure between the friction plate 880 and the first housing section 866 so that the piston 40 rotates with the housing section 866 and the input shaft 860. The piston may be connected to the output shaft 862 through a damper. In the example of FIG. 11, a first combination spring 800 and a second combination spring 840 cooperate to provide torque damping effect between the input shaft and the output shaft.

As discussed above, the power source (e.g., combustion engine) may output torque having certain harmonic vibration frequencies according to the number of pistons in operation and timing at which they output torque cycles. The reciprocating movement of a piston and the inertial forces created by the mass of a piston varies as the piston cycles near the top half of crank rotation as compared the cycling near the bottom half. Additionally, vibration along the driveline is further affected by forces related to torques from individual combustion cycles. Each time a cylinder fires, a torque surge is introduced to the driveline. The cyclic changes in loading related to the torque pulses during each revolution lend to various types of vibration responses. For example a first order, or first harmonic frequency, indicates cyclic loading that occurs once during every rotation of the engine output shaft (i.e., having the frequency equal to one crank rotation). Similarly, a secondary, or second order frequency, refers to vibration characteristics having a natural frequency of twice during each engine output shaft rotation. Likewise, there may be additional orders such as tertiary (third order), quaternary (fourth order), quinary (fifth order), etc. In one specific example, an even-firing eight-cylinder, four-stroke engine produces four torque pulses per revolution (a fourth order excitation). If the crankshaft in such an engine was operating at 6,000 RPM, then the frequency of the fourth order excitation may be about 400 Hz (4×6,000/60), whereas the same 4th order excitation at 7,200 RPM is a frequency of about 480 Hz.

Figure 12:
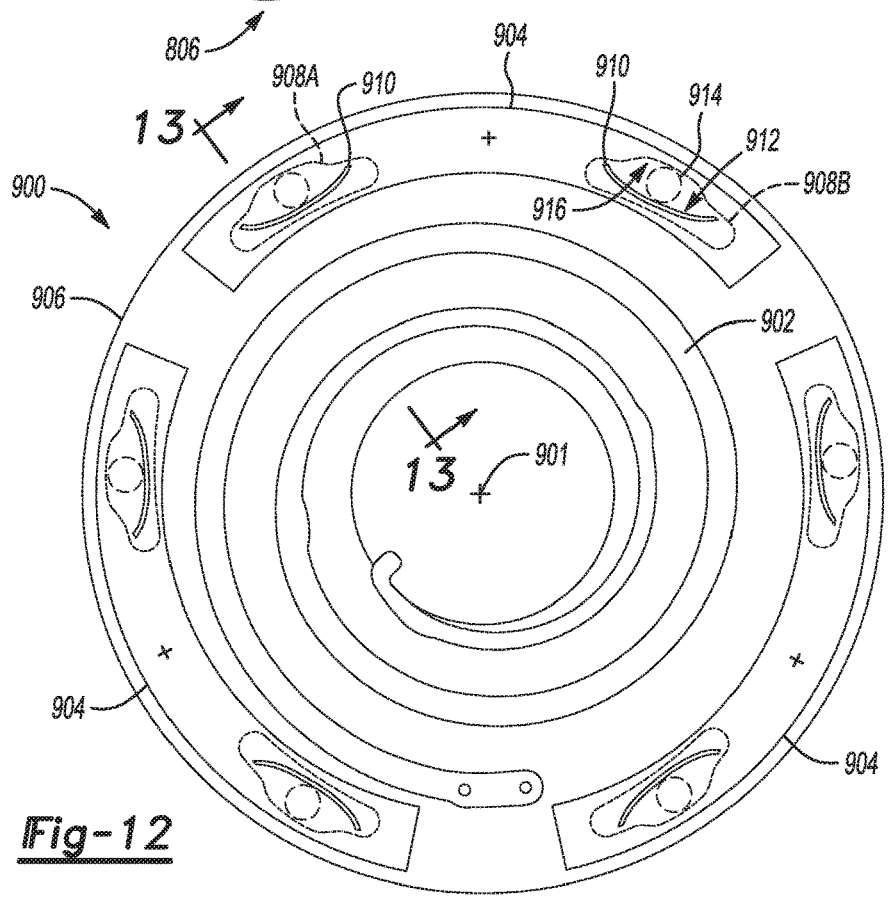
FIG. 12 is a partial view of a torque transfer mechanism having a plurality of pendulum mass absorbers along an axis of rotation.

In additional examples, a torque transfer mechanism may include one or more pendulum mass absorbers which operate in combination with a clockspring damper. Such absorbers may be referred to as centrifugal pendulum absorbers (CPA's) and are operative to attenuate torque vibration inputs by undergoing cyclic motion along a predefined path. Referring to FIG. 12, a torque transfer device 900 is provided and includes a clockspring damper 902, arranged to cooperate with a plurality of pendulum mass absorbers 904. With additional reference to FIG. 13, a cross section of torque transfer device 900 is depicted. The torque transfer device is incorporated as part of a torque converter which includes similar components as examples discussed above. Where applicable, similar numbering is applied to refer to similar components. Each of the pendulum mass absorbers 904 are moveably coupled to a mass plate 906, and are circumferentially arranged about a rotational axis 901 of the mass plate 906 in a substantially symmetrical pattern. In the example of FIG. 12, three pendulum mass absorbers 904 are included on each side of the mass plate 906 of the torque transfer device, however it should be appreciated that other quantities of pendulum mass absorbers 904 may be suitable. According to other aspects, the mass plate 906 may be integrated as part of the input member of the torque transfer device. The mass plate 906 includes two apertures 908A and 908B for each of the pendulum mass absorbers 904. Protrusions 910 are connected to the pendulum mass absorbers 904 and correspond to each aperture 908, where each protrusion 910 extends through an aperture 908 and connects to a pendulum mass 904 on an opposing side of the mass plate 906. In this way a pair of opposing pendulum mass absorbers 904 may sandwich a portion of the mass plate 906. Each of the protrusions includes a concave shelf portion 912 to contain a roller element 914. Each roller element 914 is trapped between an outer edge 916 of a corresponding aperture 908 and a shelf portion 912. According to some examples, the roller element 914 is a ball bearing. In other examples, the roller element may define a cylindrical shape which interacts with the shelf portion 912 and a corresponding aperture 908. The shape of the outer edges 916 of the apertures 908 combined with the shape of the shelf portions 912 defines a path of motion for each of the pendulum mass absorbers 904.

While the mass plate 906 is at rest, the pendulum mass absorbers 904 each remain generally stationary and do not move. However, each pendulum mass absorbers 904 oscillates or travels according to the shape of a corresponding aperture when the mass plate 906 rotates about the axis 901. For example, as each pendulum mass absorber 904 travels about a corresponding roller element 914, a portion of an outer surface roller element 914 traverses the outer edge 916 of each aperture 908A and 908B. Accordingly, each pendulum mass absorber 904 travels along a specific predetermined path that is determined by the contour of the outer edges 916 which control the movement of each corresponding pendulum mass absorber 904. The movement of the pendulum mass absorbers 904 along the predetermined path counteracts at least some of the torque fluctuations related to engine operation, thereby reducing torsional vibration. The fixed mass and predetermined motion path of each of the mass absorbers causes them to exhibit a resonance which varies in proportion to the speed of the base plate. The mass absorbers may thus be configured to counteract a particular vibrational order of torsional vibration input torque of the engine.

Figure 14:
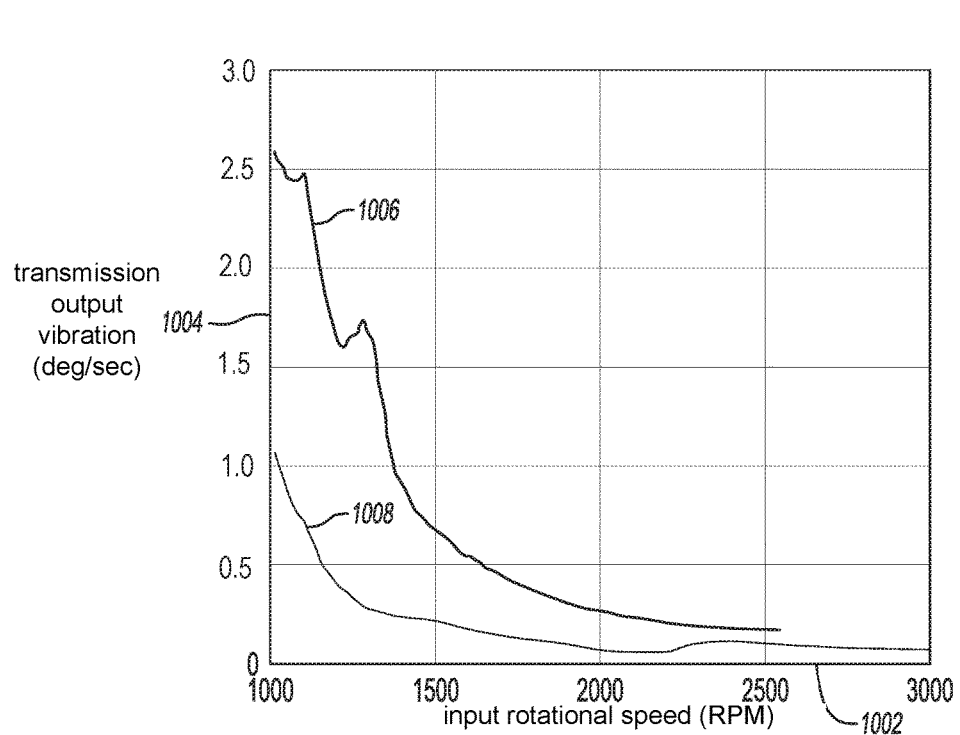
FIG. 14 is a plot of vibration input rotational speed for a torque transfer device having a damper and a pendulum mass absorber.

Referring to FIG. 14, plot 1000 depicts vibration response of damper systems having a clockspring damper, both with and without pendulum mass absorbers. Horizontal axis 1002 represents rotational speed of the input torque to a torque transfer mechanism in RPM. Vertical axis 1004 represents TOV performance of a first order vibration of an engine input at 150 Nm in a sixth gear in relative angle rotation per second. By reference, this engine operating condition may correspond to highway speed cruising, which is a commonly occurring operating condition for a given propulsion system. Curve 1006 represents performance of a torque transfer device having only a spring damper as discussed above. Curve 1008 represents vibration performance of a torque transfer device having both of a spring damper and a pendulum mass vibration absorber mechanism. The change in performance may be significant in practice because the particular order of driveline vibration is greatly reduced across the spectrum of operation. In particular, the magnitude of curve 1008 drops below the acceptable threshold, about 0.5 TOV, at around 1100 RPM. Comparatively, curve 1006 representing performance without pendulum mass absorbers does not meet preferred vibration performance until about 1600 rpm. Thus the torque converter clutch can be fully locked sooner (at approximately 500 RPM lower speed), improving fuel economy.

Figure 15:
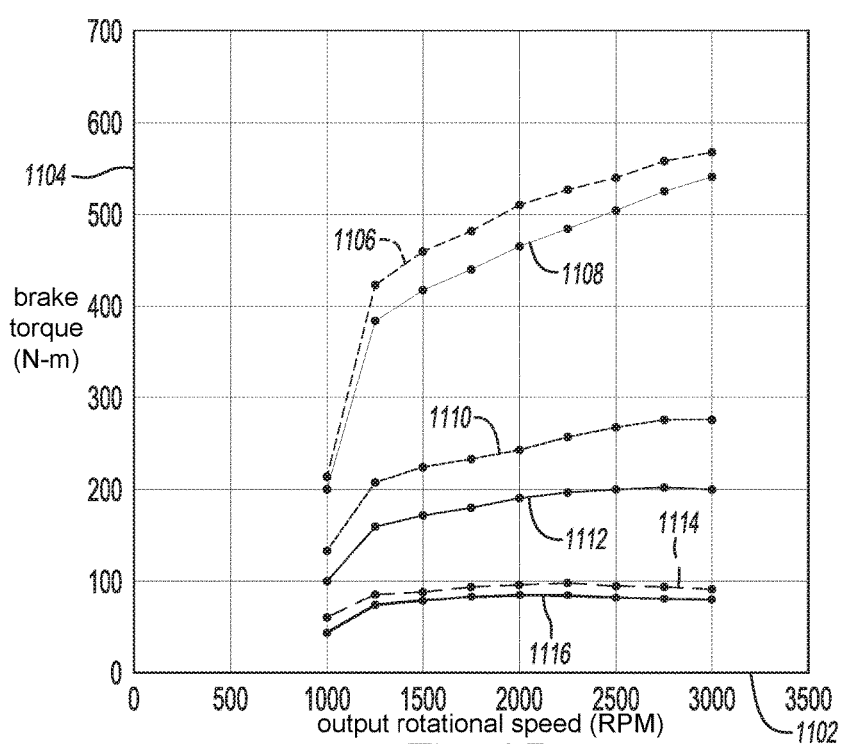
FIG. 15 is a plot of input torque versus rotational speed for various frequency orders of a combustion engine.

As discussed above, CPA systems are generally configured to address a single engine vibration order, yet several vibration orders may exist for a given propulsion system. Since the vibratory response is unique to the mass, position, inertia, and movement path of the pendulum mass absorbers, changes in frequency of vibration of the torque input form the engine may be outside of the effective range of a single CPA. Thus is may be desirable to have a CPA mechanism that is capable of absorbing vibration associated with multiple vibration orders engine. Referring to FIG. 15, plot 1100 depicts brake torque as a function of engine speed for a range of different engine vibration orders. Horizontal axis 1102 represents rotational output speed of the torque transfer mechanism in rotations per minute (RPM). Vertical axis 1104 represents brake torque of the engine in Nm. Engine torque oscillation order may be an integer that is defined as the number of engine torque oscillations per every engine revolution. Curves 1106, 1108, 1110, 1112, 1114, and 1116 represents performance of first order engine vibration through sixth order vibration mode, respectively. While each of the engine vibration orders require some degree of mitigation, the lower order vibrations are often the largest and the most difficult to absorb because of their low frequency. For example when referring to a four cylinder engine, second order vibration may be present during a normal operation mode, and first order vibration present when in a cylinder deactivation mode. Thus the CPA system may be arranged to absorb the worst of the low order vibrations and the torque transfer mechanism may rely on one or more damper to mitigate higher order vibrations. The predetermined motion path of the mass plate provides an improved vibration reduction over circular and cycloidal paths. In addition, the path allows for quick and stable transient response during rapid engine speed changes.

Referring to FIG. 16, a cross section of a dual CPA configuration is depicted. Torque transfer device 1200 is provided as part of a torque converter which includes similar components as examples discussed above. Where applicable, similar numbering is applied to refer to similar components. The torque transfer device 1200 is includes a clockspring damper 1202, arranged to cooperate with a plurality of pendulum mass absorbers 1204. Similar to previous examples, each of the mass absorbers 1204 are moveably coupled to a mass plate 1206. In the example of FIG. 16, two different types of mass absorbers are provided where each distinctly counteracts a different order of vibration input. A first subset 1208 of the plurality of mass absorbers is located a first distance 1210 from the axis of rotation 1201 to attenuate a first mode of torsional vibration. Similarly, a second subset 1212 of the plurality of mass absorbers is located a second distance 1214 from the axis of rotation 1201 to attenuate a second mode of torsional vibration. Each of the set of first mass absorbers 1208 and second mass absorbers may also have unique masses and shapes to cause distinct inertial effects. In some examples, the shape of a guiding outer edge of each of the corresponding apertures may be unique causing the first set of pendulum masses to take a different movement path relative to the second set of pendulum masses. In this way, a combination of at least one of the distances from the axis of rotation, unique inertial properties, and/or unique motion paths allow the separate CPA's to independently influence responses to different engine operating modes. More specifically, the first set of mass absorbers 1208 may be activated to counteract a first order of engine vibration, and the second set of mass absorbers 1212 may be activated to counteract a different, second order of engine vibration. Through the foregoing variations, a clockspring damper may enable a torque converter clutch to lock up under low speed and all firing fractions of the vehicle's engine, with efficient cost and mass.

While exemplary embodiments are described above, it is not intended that these embodiments describe all possible forms encompassed by the claims. The above description of variants is only illustrative of components, elements, acts, product and methods considered to be within the scope of the invention. The words used in the specification are words of description rather than limitation, and it is understood that various changes can be made without departing from the spirit and scope of the disclosure. As previously described, the features of various embodiments can be combined and rearranged to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A torque transfer mechanism for transmitting torque from a torque output member of a propulsion source to a transmission input member of a transmission assembly, the propulsion source including an engine and/or a motor, the torque transfer mechanism comprising:
   an input member configured to attach to the torque output member and receive an input torque from the propulsion source;
   an output member coupled to the input member and configured to attach to the transmission input member and transfer the input torque to the transmission assembly; and
   a damping mechanism including a clockspring attached at a first end thereof to the input member and at a second end thereof to the output member, the first end being axially spaced from the second end relative to an axis of rotation of the clockspring, the clockspring including:
a first portion proximate the first end and having a first thickness with a first spring rate corresponding to a first range of rotational travel of the clockspring, and
a second portion proximate the second end and having a second thickness with a second spring rate, greater than the first spring rate, corresponding to a second range of rotational travel of the clockspring.

2. The torque transfer mechanism of claim 1, wherein the clockspring has a coil length extending between the first and second ends, and wherein the second thickness is greater than the first thickness.

3. The torque transfer mechanism of claim 2, wherein the output member includes a hub, and wherein the first portion of the clockspring is arranged to wrap around the hub of the output member and stop deforming after a predetermined amount of rotation during the first range of travel of the clockspring relative to the hub.

4. The torque transfer mechanism of claim 3, wherein the second portion deforms in response to additional rotation of the clockspring relative to the hub beyond the first range of travel once the first portion stops deforming.

5. The torque transfer mechanism of claim 1, wherein the damping mechanism further comprises a second clockspring acting in cooperation with the clockspring to damp vibration associated with the input torque.

6. The torque transfer mechanism of claim 1, wherein the clockspring is a clockwise-wound clockspring having a first detent, the damping mechanism further including a counterclockwise-wound clockspring coupled to the clockwise-wound clockspring and having a second detent, wherein the first detent engages the second detent after a predetermined deflection of the clockwise-wound clockspring relative to the counterclockwise-wound clockspring to thereby lockout further deflection of select portions of the clocksprings.

7. The torque transfer mechanism of claim 1, wherein the clockspring is a clockwise-wound clockspring, the damping mechanism further including a counterclockwise-wound clockspring coupled to the clockwise-wound clockspring.

8. The torque transfer mechanism of claim 7, wherein the clockwise-wound clockspring does not contact itself under torsional deflection, and wherein the counterclockwise-wound clockspring does not contact itself under torsional deflection.

9. The torque transfer mechanism of claim 8, wherein the counterclockwise-wound clockspring includes an outer portion and an inner portion radially inward of the outer portion, the inner portion having a first thickness and the outer portion having a second thickness greater than the first thickness.

10. A torque transfer mechanism for transmitting torque from a torque output member of a propulsion source to a transmission input member of a transmission assembly, the torque transfer mechanism comprising:
an input member configured to attach to the torque output member and receive an input torque from the propulsion source;
an output member coupled to the input member and configured to attach to the transmission input member and transfer the input torque to the transmission assembly; and
a first clockspring and a second clockspring each attached at a first end thereof to the input member and at a second end thereof to the output member, the first ends being axially spaced from the second ends relative to an axis of rotation of the clockspring, the first and second clocksprings being configured to cooperate to resist relative rotation between the input member and the output member, wherein the first and second clocksprings are interleaved with each other such that coil lengths of the clocksprings contact each other to restrict further deformation of a first portion of the coil lengths after a predetermined initial rotation travel.

11. The torque transfer mechanism of claim 10, wherein a second portion of the coil lengths of the first and second clocksprings continues to deform during a subsequent rotational travel beyond the predetermined initial rotation travel in response to the input torque.

12. The torque transfer mechanism of claim 11, wherein the predetermined initial rotation travel is associated with a first spring rate of the first and second clocksprings and the subsequent rotational travel is associated with a second spring rate of the first and second clocksprings.

13. The torque transfer mechanism of claim 10, wherein the coil lengths of the first and second clocksprings that contact each other are inner portions of the coil lengths.

14. The torque transfer mechanism of claim 10, wherein the coil lengths of the first and second clocksprings wrap around a hub portion of the output member during the predetermined initial rotational travel.

15. The torque transfer mechanism of claim 10, wherein the coil lengths of the first and second clocksprings each defines a detent configured to engage the detent of the other clockspring at a predetermined contact point.

* * * * *